United States Patent [19]

Weinstein

[11] Patent Number: 5,138,513
[45] Date of Patent: Aug. 11, 1992

[54] ARC PREVENTING ELECTROSTATIC POWER SUPPLY

[75] Inventor: Richard Weinstein, Toledo, Ohio

[73] Assignee: Ransburg Corporation, Indianapolis, Ind.

[21] Appl. No.: 644,935

[22] Filed: Jan. 23, 1991

[51] Int. Cl.$^5$ .............................................. H02H 3/08
[52] U.S. Cl. .......................................... 361/2; 361/93; 361/42; 361/235
[58] Field of Search ...................... 361/2, 93, 42, 235, 361/225, 228, 220; 323/240

[56] References Cited

U.S. PATENT DOCUMENTS

| | | | |
|---|---|---|---|
| 4,187,527 | 2/1980 | Bentley | 361/235 |
| 4,390,831 | 6/1983 | Byrd et al. | 323/240 |
| 4,402,030 | 8/1983 | Moser et al. | 361/93 |
| 4,745,520 | 5/1988 | Hughey | 361/228 |

OTHER PUBLICATIONS

Rans-Pak 100 Power Supply Service Manual, pp. 8 and 9, Ransburg-Gema, 1989.

Primary Examiner—H. L. Williams
Assistant Examiner—S. W. Jackson
Attorney, Agent, or Firm—MacMillan, Sobanski & Todd

[57] ABSTRACT

An arc preventing electrostatic power supply suitable for operating an electrostatic paint atomizer such as a rotary atomizer. High voltage control is based on the high voltage current, as measured in the ground return path. The power supply is controlled to provide a substantially constant high voltage DC output up to a predetermined current and an output voltage which rapidly drops off as the current increases above the predetermined current. The magnitude of an AC component superimposed on the high voltage DC current is detected to determine incipient arcing. Upon detecting an incipient arcing condition, the output voltage is interrupted for a predetermined short time. When the output voltage is turned back on, it is ramped up from a low level back to the normal high voltage level. While the output voltage is less than a predetermined low level, the sensitivity of the incipient arc detection circuit is increased. The output voltage is again interrupted for the predetermined short time whenever an incipient arcing event is detected.

12 Claims, 6 Drawing Sheets

ARC PREVENTING ELECTROSTATIC POWER SUPPLY

TECHNICAL FIELD

The invention relates to electrostatic power supplies and more particularly to an improved arc preventing electrostatic power supply suitable for use, for example, with electrostatic paint atomizers such as spray guns and rotary atomizers.

BACKGROUND ART

In certain paint spraying equipment, the paint is atomized and electrostatically charged to a high voltage relative to the workpiece being painted. The charge on the paint droplets attracts the droplets to the workpiece to greatly increase the paint transfer efficiency and to improve the uniformity of the applied coating. DC voltages on the order of 40,000 to 100,000 volts or more may be used for charging the paints. Normally, the workpiece is maintained at ground potential during painting. Since 100,000 volts will jump a several inch gap, care must be taken to keep the spray gun away from grounded objects while the high voltage is on to prevent arcing. Many paints have flammable solvents. Consequently, an arc from the high voltage paint charging circuit can result in an explosion and/or a fire. Also, the high voltage represents a hazard to any operating personnel in the vicinity of the spray gun.

Various techniques have been used for controlling arcing from an electrostatic power supply. In many electrostatic spray guns, a very large value resistor is placed in the high voltage circuit. During normal operation, the current flow in the high voltage circuit is very low and consequently the voltage drop across the resistor is not significant. As the output current increases when a grounded object is approached, there is a reduction in the output voltage due to the voltage drop across the resistor. The voltage drop reduces but does not eliminate the risk of arcing. The resistor also can reduce the amount of energy available in the event that arcing takes place. This in turn reduces the risk of a dangerous level shock to operating personnel and also reduces the risk that an arc will have sufficient energy to produce ignition of flammable paint solvents. Preferably, the paint charging electrode is small in mass and the resistor is placed very close to the charging electrode to minimize the capacitance between the high voltage paint charging electrode and ground, thereby minimizing the stored energy available in the event of arcing. For a rotary paint atomizer which is mounted in a spray booth, a stiff or substantially constant high voltage is generally used to achieve better coating quality. In other words, there is no current limiting resistor in the high voltage circuit. However, such systems may incorporate incipient arc detecting circuitry which detects an incipient arc event and interrupts the high voltage prior to actual arcing.

An early arc prevention technique involved looking at the magnitude of the DC current in the ground return for the high voltage circuit. When the current exceeded a predetermined maximum level, the high voltage was interrupted. However, if the output current suddenly increased, an arc could occur before the high voltage was interrupted. The arc would have sufficient energy to cause ignition. In the flammable atmosphere present in many spray booths during painting, such an arc cannot be tolerated. Unless the predetermined maximum current is established at a level significantly below the current required for an arc, the high voltage will not be interrupted prior to arcing. However, setting the predetermined maximum current at such a low level reduces the effectiveness of the power supply.

More recently, circuits have been developed to analyze the current in the high voltage ground return path. One technique looks at the rate of change in the high voltage DC current. As a grounded object is approached by the paint charging electrode, there is an increase in the DC current. When the rate of change or di/dt of the DC current exceeds a predetermined level, it is assumed that an arc is about to take place and the high voltage is interrupted prior to actual arcing. Thus, incipient arcing is detected. A corona discharge from the high voltage paint charging electrode prior to arcing also creates a low level AC current which is superimposed on the DC current. According to another technique, the magnitude of any AC current component superimposed on the DC current is detected. When the AC current component exceeds a predetermined level, it is determined that an incipient arcing condition is present and the high voltage is interrupted prior to actual arcing.

In prior art electrostatic power supplies, it has been necessary either to disable the incipient arc detection circuitry during start up to prevent automatic shutdown from the initial current change. If a grounded object is too close to the high voltage circuit during start up, an arc will occur. The prior art arc prevention circuits interrupt the high voltage whenever either a excessive ground return current is detected or an incipient arcing condition is detected. However, once the high voltage is interrupted, the systems required a manual reset by a systems operator. If, for example, a rotary atomizer is used to paint an automobile body on a production line, the quality of the paint applied to the body would be unacceptable if the high voltage is interrupted more than a brief time. It has been determined that if the voltage is reestablished within a short time, for example, of no more than about 1 second, an acceptable coating can be applied. However, the prior art arc preventing power supplies are not capable of automatically restarting after shutdown. If the power supply was quickly restarted and an arcing condition still existed, the resulting arc could cause a fire or an explosion.

DISCLOSURE OF INVENTION

According to the invention, an arc preventing electrostatic power supply is designed to provide improved protection against arcing by shutting down in response to a detected incipient arc event and also to automatically restart after a predetermined short shutdown time without risk of arcing. The power supply produces a high DC voltage at a substantially constant magnitude so long as no more than a predetermined current flows in the high voltage circuit. During normal operation, the output current is less than the predetermined current. As the current increases above the predetermined current, the high voltage rapidly decreases. Consequently, a substantially constant voltage is maintained during normal coating. As a grounded object approaches the high voltage paint charging electrode, the voltage on the electrode will be decreased in response to the current increase to reduce the risk of arcing.

The power supply is provided with soft start circuitry which ramps up the output voltage from zero whenever the power supply is turned on. For example, the voltage may go from zero volts to 100,000 volts over an interval of about 4 seconds. At all times while the power supply has an output voltage, an incipient arc detection circuit monitors the output. The circuit preferably monitors any AC component on the DC output current. When the AC component reaches a predetermined level because of an incipient arcing condition, the arc detection circuitry interrupts the high voltage output. After a predetermined short time delay such as about 1 second, the circuitry attempts to turn the output voltage back on. So long as no incipient arcing is detected and so long as the current remains no greater than the predetermined current, the voltage will ramp up to the maximum voltage. If the current exceeds the predetermined current, the maximum voltage level will be reduced based on the level of the high voltage DC current. If an incipient arc event is again detected at any time after the output voltage is turned on, the output voltage will again be interrupted.

When the voltage is initially turned on and still at a low level, for example, less than about 10,000 volts, any AC currents produced by an incipient arcing condition will have a significantly lower level than if the output voltage were high. In order to reduce the risk of arcing when the output voltage is initially turned on, the gain of the incipient arc detection circuit is increased while the voltage remains less than, for example, 10,000 volts. Consequently, the circuit is effective for sensing an incipient arcing condition at low output voltages during a soft start.

Accordingly, it is an object of the invention to provide an improved arc preventing electrostatic power supply.

Other objects and advantages of the invention will be apparent from the following detailed description and the accompanying drawings.

BEST MODE FOR CARRYING OUT THE INVENTION

Figure 1:
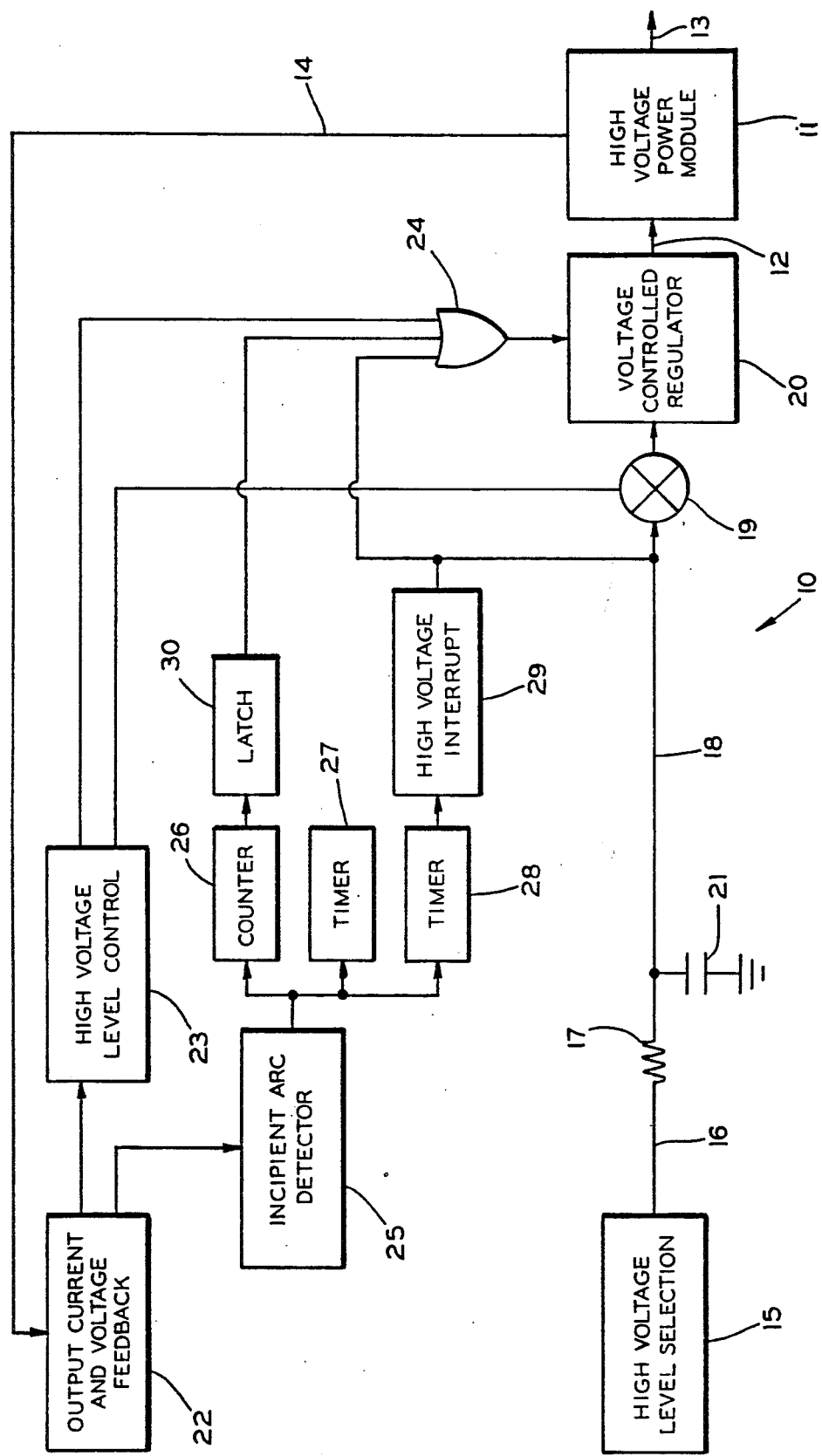
FIG. 1 is a block diagram of a high voltage electrostatic power supply including arc preventing controls according to the invention.
Figure 2:
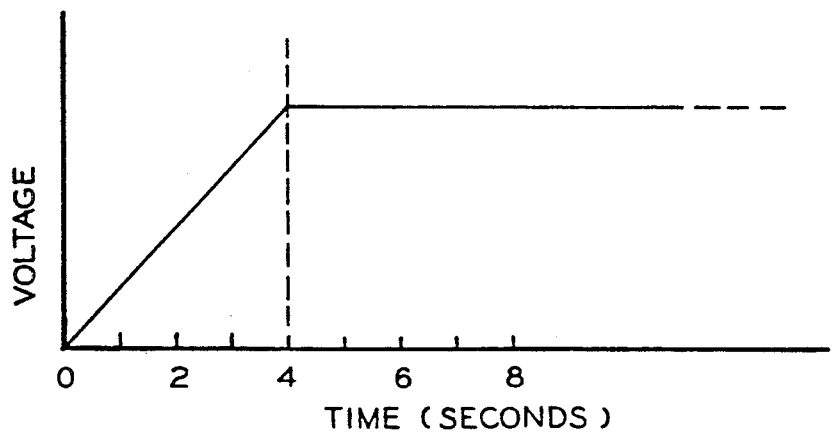
FIG. 2 shows an exemplary graph of the high voltage output from the power supply illustrated in FIG. 1 verses time after the power supply is started or restarted after shutdown.
Figure 3:
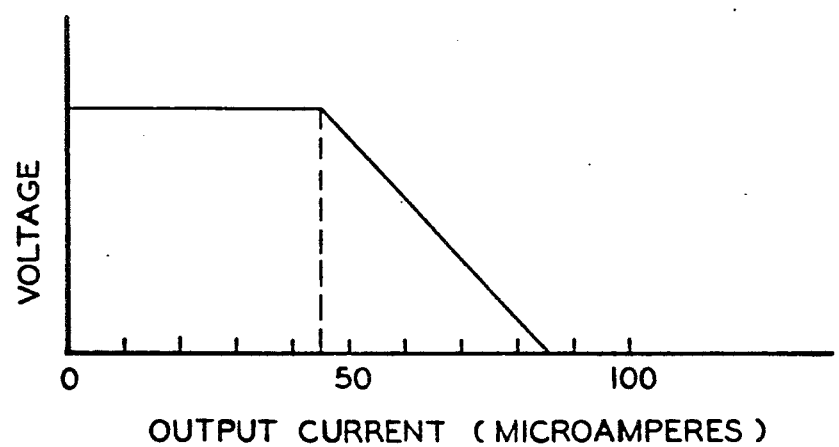
FIG. 3 shows an exemplary graph of the high voltage output verses output current for the power supply illustrated in FIG. 1.

Turning to the drawings and particularly to FIGS. 1-3, FIG. 1 is a block diagram illustrating an arc preventing electrostatic power supply 10 according to the invention. Under normal operating conditions, the power supply 10 will have an adjustable high voltage DC output of up to 100,000 volts, for example. However, the output voltage is reduced during start up and in the event that the output current exceeds a predetermined current. FIG. 2 is a graph showing the output voltage from the power supply 10 as a function of time after initial start up and after automatic restart in the event of a shutdown in response to the detection of an incipient arc event. FIG. 3 is a graph showing the output voltage from the power supply 10 as a function of output current.

The power supply 10 includes a conventional high voltage power module 11 which converts a low DC voltage on a power input 12 to a high DC voltage which is applied on an output 13 to an electrostatic coating applicator such as a rotary atomizer (not shown). Such a power module 11 typically includes an oscillator which converts the low DC voltage from the input 12 to a low AC voltage, a voltage step up transformer which increases the low AC voltage to an intermediate level AC voltage, and a capacitor and diode voltage multiplier network which rectifies and multiplies the intermediate level AC voltage to establish the high voltage DC output 13. The power module 11 also has low level outputs 14 which provide feedback signals indicative of the high voltage output current and voltage. Typically, the current is measured in the ground return path for the high voltage.

The voltage established at the output 13 is controlled in response to the level of the DC voltage on the input 12. In the exemplary power supply 10, the voltage on the output 13 is controlled between zero and 100,000 volts. The maximum level of the output voltage is determined by voltage level selection circuitry 15. The maximum voltage may be selected by the user, for example, by setting switches to select one of several preset voltages, or by a programmable process controller (not shown) which supplies a voltage or a current representing the desired output voltage. The selection circuitry 15 has an output 16 having a voltage which falls within a range which establishes the voltage on the output 13. For example, a voltage range of from zero to 10 volts on the output 16 may control the high voltage on the output 13 between zero and 100,000 volts. The output 16 is applied through a resistor 17 to a junction 18 and then through a summing junction 19 to a voltage controlled regulator 20. The junction 18 also is connected through a capacitor 21 to ground. The voltage controlled regulator 20 establishes the voltage on the power input 12 to the power module 11.

The power supply 10 includes soft start circuitry and arc prevention circuitry. The feedback outputs 14 from the power module 11 are applied through an output current and voltage feedback circuit 22 to a high voltage level control circuit 23. The circuit 23 is connected through an OR gate 24 to the voltage controlled regulator 20 to interrupt the high voltage on the output 13 in the event of either an undesirably high output voltage or an excessive output current. The level control circuit 23 also is connected to the summing junction 19 to provide feedback control over the voltage level of the output 13 by increasing the drive from the regulator 20 when the voltage on the output 13 is too low. The level control circuit 23 attempts to maintain a constant high voltage output up to a preset output current. Consequently, the power supply 10 acts as a stiff regulated power supply so long as the output current is less than the preset current. Above the preset current, the high voltage output becomes highly unregulated. As the output current increases above the preset output current, the output voltage is rapidly decreased by the high voltage level control circuitry 23.

As shown in the exemplary graph of FIG. 3, the high voltage output remains substantially constant for output currents between 0 and 45 μa. As the output current increases from 45 μa to 85 μa, the high voltage level control circuit 23 causes the output voltage to drop from the maximum to zero. Consequently, as the atomizer approaches a grounded object and current flow in the high voltage circuit increases above the preset level, the level of the high voltage will rapidly decrease. This rapid voltage decrease reduces the risk of arcing from the atomizer and also reduces the available stored energy in the event of an arc.

The automatic voltage drop as current increases has an advantage of allowing a rotary atomizer to coat an inside corner, sometimes referred to as a Faraday cage. During normal operation, a rotary atomizer is typically positioned between 8 and 12 inches from the workpiece being coated and the atomizer voltage is maintained constant. In order to paint an inside corner, it is necessary to lower the voltage to prevent arcing, to increase any shaping air and to move the atomizer closer to the corner. The lower voltage and increased shaping air causes the atomized paint to be blown into the corner before it is attracted to the closer sidewalls by the electrostatic charge. As a consequence of the voltage-current operating curve of FIG. 3, the power supply 10 automatically reduces the voltage to prevent arcing as a corner is approached by the atomizer due to the increased output current.

The output current and voltage feedback circuit 22 also supplies an output current based signal to an incipient arc detector circuit 25. The circuit 25 detects the level of any AC component on the DC current at the output 13. Corona discharge from the atomizer is reflected as an AC component of the output current. As a grounded object is approached, corona discharge increases and the AC component increases until there is an arc discharge from the atomizer. When the AC component of the output current reaches a predetermined level prior to arcing, an incipient arcing condition is present and the circuit 25 applies a signal to a counter 26 and to two timers 27 and 28. The timer 28 drives a high voltage interrupt circuit 29 which grounds the junction 18 and applies a signal through the OR gate 24 to interrupt the high voltage output 13. The timer 28 times out in a short time interval, such as about 1 second.

After the timer 28 times out, the OR gate 24 no longer blocks the high voltage on the output 13. However, the drive to the voltage controlled regulator 20 had been grounded and the voltage on the output 13 is zero. The resistor 17 and the capacitor 21 form an RC timing network which allows the voltage on the junction 18 to ramp up to its normal voltage over a predetermined time. For example, after the high voltage output has been interrupted due to an incipient arc detection event, the resistor 17 and the capacitor 21 may be selected to allow the voltage on the junction 18 to increase from zero to substantially its normal voltage over a 4 second interval. The resulting output voltage/time curve is shown in FIG. 2. It will be appreciated that although a linear ramp curve is shown, the curve may be exponential and that the timing may be modified to suit the application.

For most commercial applications, the paint charging voltage on a rotary atomizer may be briefly interrupted. For example, if the atomizer voltage is reestablished within about 1 second, the applied coating will be acceptable, although somewhat thinner. A rotary atomizer can be operated at a voltage much lower than the normal optimum voltage. The lower voltage will merely result in a lower coating transfer ratio. The incipient art detector circuit 25, the timer 28 and the high voltage interrupt circuit 29 function to attempt to automatically reestablish the high voltage on the output 13 after an incipient arc event is detected. The time before the voltage is reestablished is determined by the time interval of the timer 28. If there was any further risk of arcing, the prior art power supplies could not be automatically restarted. By restarting the power supply 10 with the voltage curve shown in FIG. 2, a continuing or a new incipient arc event can be detected at a lower than normal voltage before an arc actually occurs.

Each incipient arc event detected by the circuit 25 also starts the resettable timer 27 and increments the counter 26. The timer 27 measures a time increment, for example, of about 30 seconds. If a preset count is reached before the timer 27 times out, a latch 30 is set. For example, if the counter 26 is set to count 4, the latch 30 will be set when 4 incipient arc events are detected with less than 30 seconds between 2 consecutive detected events. An output from the latch 30 is applied through the OR gate 24 to block further attempts to reestablish an output voltage until the latch 30 is reset.

FIG. 4 shows details of portions of the power supply 10 including the voltage controlled regulator 20 and of the high voltage power module 11. A DC voltage is applied from a suitable power source (not shown) to a power input terminal 34 and a grounded terminal 35. A capacitor 36 and a resistor 37 are connected between the terminal 34 and ground to filter the DC power. The terminal 34 is connected to the emitter of a transistor 38 and the collector of the transistor 38 is connected to the voltage controlled regulator 20. A safety interlock input 39 (from FIG. 7) is connected through a resistor 40 to a positive voltage terminal 41 and through a zener diode 42 to the base of a transistor 43. The positive terminal 41 is connected to a 15 volt low voltage DC power source (not shown). The emitter of the transistor 43 is connected to ground and the collector is connected through a resistor 44 to an enable line 46 (from FIG. 5) and through a zener diode 45 to the base of a transistor 47. The enable line 46 is active whenever either of two ranges is selected, as will be discussed in detail below. The emitter of the transistor 47 is connected to ground and the collector is connected through a resistor 48 to the base of the transistor 38. The safety interlock input 39 will be such as to cause the transistor 38 to be turned off to block power to the high voltage power module 11 whenever there is either an undesirably high overvoltage on the output 13, whenever the current at the output 13 exceeds a preset maximum current, for a predetermined short time after an incipient arc event is detected and whenever a predetermined number of incipient arc events are detected within a predetermined time interval.

The voltage controlled regulator 20 may be a commercially available integrated circuit regulator and has a power input connected to the collector of the transistor 38, a power output which supplies the power input 12 of the high voltage module 11 and a high voltage control input connected to a terminal 49. A diode 50 is connected between the power input and the power output of the regulator 20 to suppress transients. The output voltage from the regulator 20 is directly proportional to and slightly greater than the voltage on the control input terminal 49 which is connected to the high voltage level control circuitry shown in FIG. 5. The power output from the regulator 20 drives an oscillator 51 in the high voltage module 11. The oscillator 51 applies a high frequency AC voltage to the primary winding of a voltage step up transformer 52 which is proportional to the voltage from the regulator 20 and in turn proportional to the voltage on the level control terminal 49. The secondary voltage from the transformer 52 is rectified and multiplied by a conventional capacitor and diode voltage multiplier network 53 to obtain the high voltage output 13. An exemplary voltage multiplier network is shown, for example, in U.S. Pat. No. 4,402,030. The power module 11 includes two additional outputs a high voltage current feedback output 54 and an output 55 which is based on a combination of the current and voltage level of the high voltage output 13.

Figure 5:
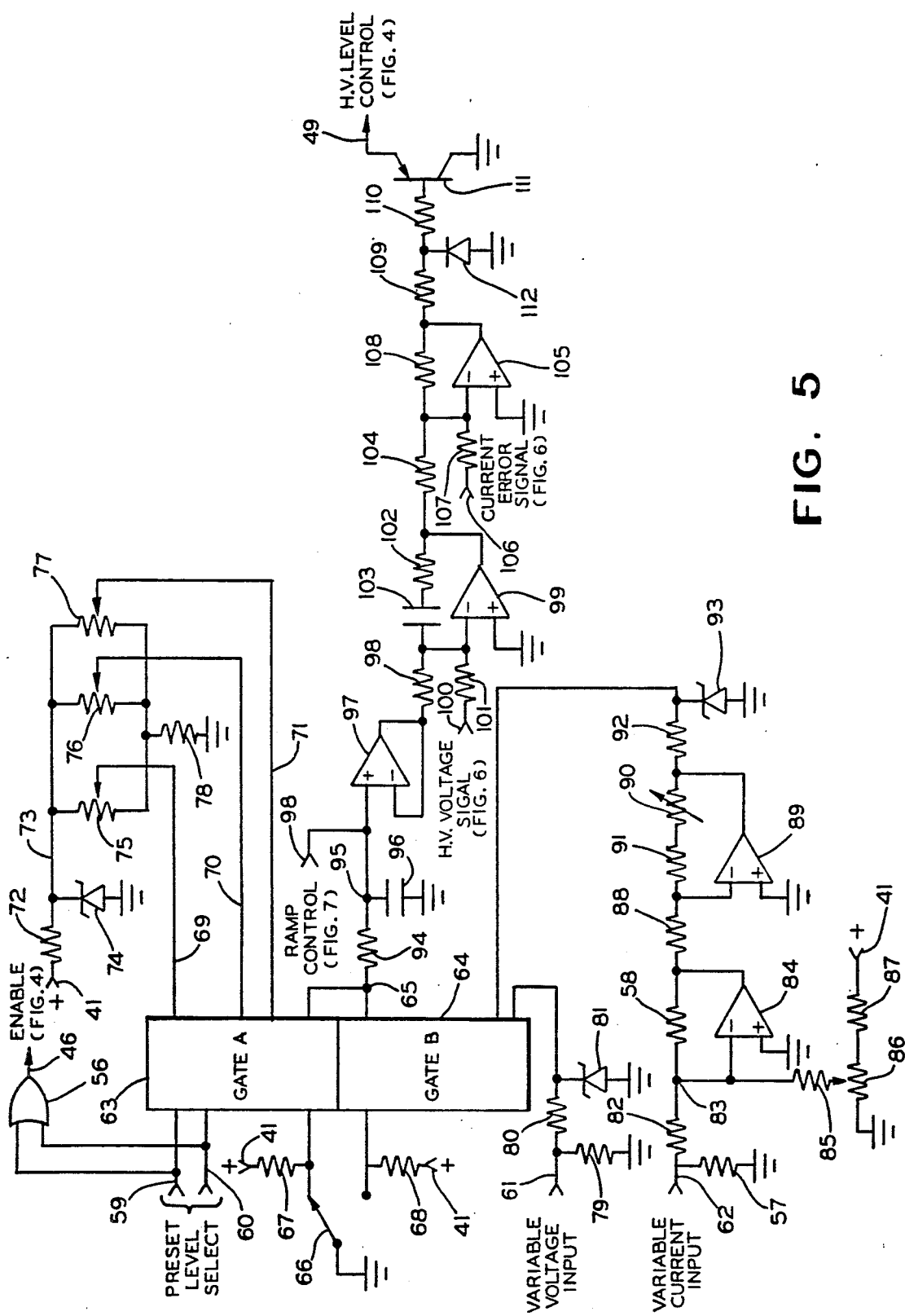
FIG. 5 is a detailed schematic diagram of voltage level selection and of high voltage level control circuitry for an arc preventing electrostatic power supply according to the invention.

FIG. 5 illustrates details of the high voltage level selection circuit 15 and other circuit portions of the power supply 10 of FIG. 1. In order to provide for different applications, the maximum output voltage available at the output 13 may be selected by different methods. Inputs 59 and 60 may be used to select one of three different preset output voltages, such as 40,000 volts, 60,000 volts or 90,000 volts. The inputs 59 and 60 also are connected through an OR gate 56 to the enable line 46. A variable voltage input 61 ranging, for example, between zero and 10 volts may be used to select an output voltage ranging between zero and 100,000 volts, or a variable current input 62 may be used to select an output voltage in the same range. The variable inputs 61 and 62 may be used, for example, with a programmed process controller which varies the output voltage as requirements change during the running of an automated painting program.

The outputs of two gates 63 and 64 are connected together to a terminal 65. A manual switch 66 and two resistors 67 and 68 are connected to selectively enable one of the gates 63 or 64. When the gate 63 is enabled, a DC voltage on one of three lines 69, 70 or 71 can be connected to the output 65, depending on the logic level of the two inputs 59 and 60. The positive terminal 41 is connected through a resistor 72 to a junction 73 and from the junction 73 through a zener diode 74 to ground. The resistor 72 and zener diode 74 regulate the voltage on the junction 73. The junction 73 is connected through the fixed terminals of three parallel potentiometers 75, 76 and 77 and a series resistor 78 to ground. The three lines 69-71 connected to the gate 63 are connected, respectively, to the adjustable terminals of the potentiometers 75-77. The three potentiometers 75-77 are set to permit selection of any of three different preset voltages on the output 65 to select three different high voltage outputs.

When the power supply 10 is controlled by an automatic process controller, the switch 66 is set to enable the gate 64 and the output voltage will be controlled in response to either a variable voltage, e.g., 0 to 10 volts, on the input 61 or a variable current or a different range variable voltage, e.g., 0 to 5 volts, on the input 62. The variable voltage input 61 is connected through a resistor 79 to ground and through a resistor 80 to the gate 64. A zener diode 81 limits the maximum voltage applied from the input 61 to the gate 64. When the gate 64 is enabled and the input 61 is used, the common gate output terminal 65 will have substantially the same voltage as is applied to the variable voltage input 61.

The variable current input 62 is connected through a resistor 57 to ground and through a resistor 82 to a terminal 83 which is applied to the input to an operational amplifier 84 and is connected through a resistor 85 to the adjustable terminal of a potentiometer 86. One fixed terminal of the potentiometer 86 is grounded and the other fixed terminal is connected through a resistor 87 to the positive terminal 41. A feedback resistor 58 is connected between the output and the inverting input of the amplifier 84. The amplifier 84 will have an output voltage which is proportional to the variable current on the input 62. The output from the amplifier 84 is applied through a resistor 88 to the input to an amplifier 89. A series connected variable resistor 90 and fixed resistor 91 provide a feedback path for adjusting the gain of the amplifier 89. The output of the amplifier 89 is applied through a resistor 92 to the gate 64. A zener diode 93 is connected to limit the maximum voltage applied to the gate 64. When the gate 64 is enabled and the input 62 is used, the common gate output terminal 65 will have a voltage which is proportional to the current at the variable current input 62.

The gate inputs 59 and 60 are used to select the range when the switch 66 enables the gate 64. A signal on the input 59 selects the input 61 and applies an enable input through the OR gate 56 to the enable line 46 and the input 60 selects the input 62 and applies an enable input through the OR gate 56 to the enable line 46. Unless one of the two inputs 59 or 60 is active to select an input 61 or 62, the enable line 46 will be low and the transistor 38 will be off to inhibit a high voltage at the output 13.

Figure 4:
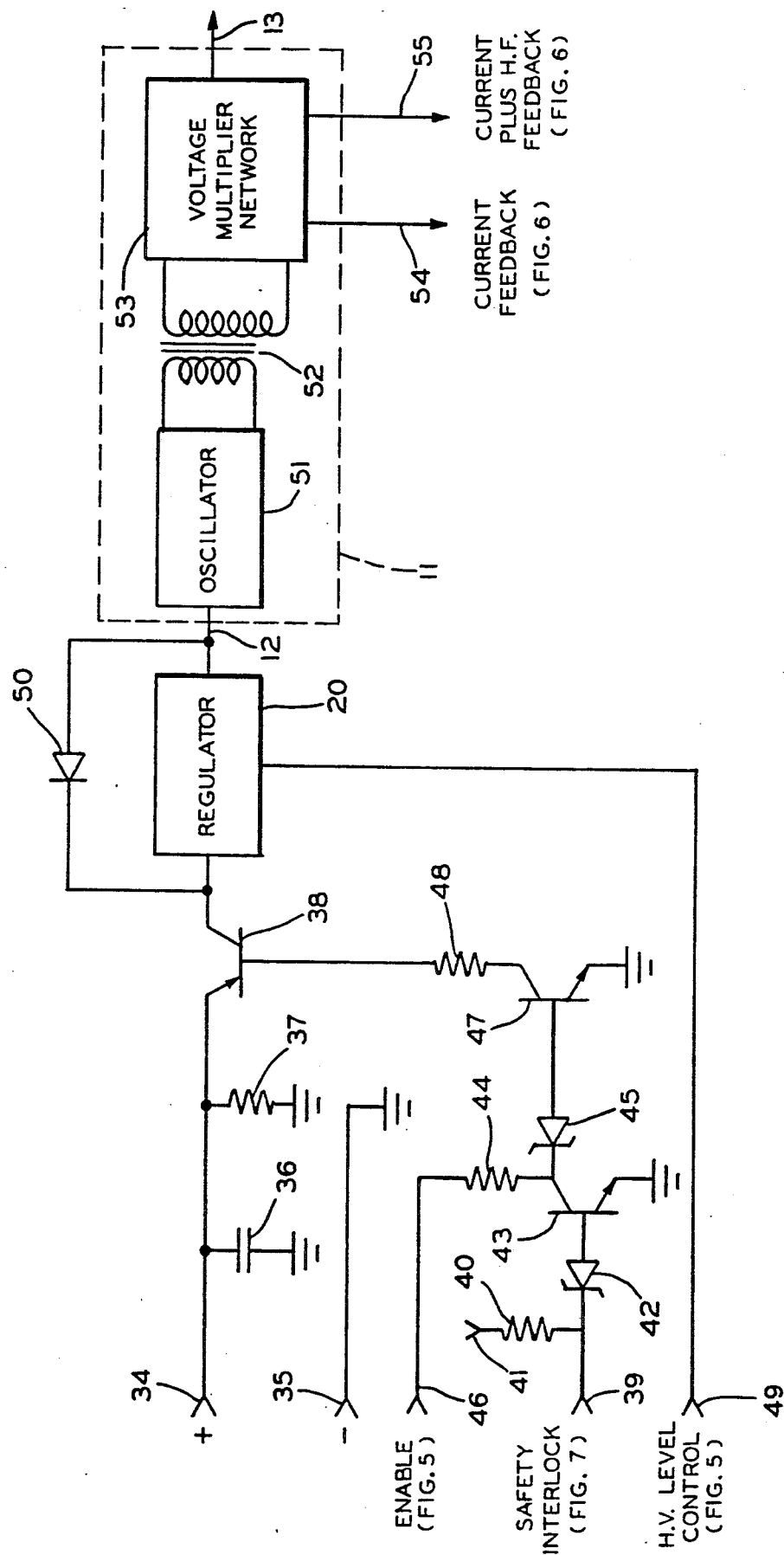
FIG. 4 is a detailed schematic diagram of the high voltage power module portion of an arc preventing electrostatic power supply according to the invention.

The common gate output 65 is applied through a resistor 94 to a junction 95. The junction 95 is connected through a capacitor 96 to ground, to an input to a voltage follower amplifier 97 and to a ramp control input 98 (from FIG. 7). The output from the voltage follower 97 is applied through a resistor to an input to an integrating amplifier 99. A high voltage signal input 100 also is connected through a resistor 101 to the input to the integrating amplifier 99. A series connected resistor 102 and capacitor 103 provide feedback for the amplifier 99. The output from the integrating amplifier 99 is applied through a resistor 104 to the input to an amplifier 105. An error signal input 106 (from FIG. 6) also is applied through a resistor 107 to the input to the amplifier 105. A feedback resistor 108 is connected between the output and the inverting input to the amplifier 105. The output from the amplifier 105 is applied through two series resistors 109 and 110 to the base of a transistor 111. A diode 112 is connected from between the resistors 109 and 110 to ground. The collector of the transistor 111 is connected to ground and the emitter is connected to the high voltage control terminal 49 to control the output voltage from the regulator 20 (FIG. 4). Under normal operating conditions, the output voltage from the regulator 20 will be directly proportional to the voltage on the common output terminal 65 from the gates 63 and 64. As will be discussed below, this voltage may be modified by the ramp control input 98, the high voltage input 100 and the error signal input 106.

Figure 6:
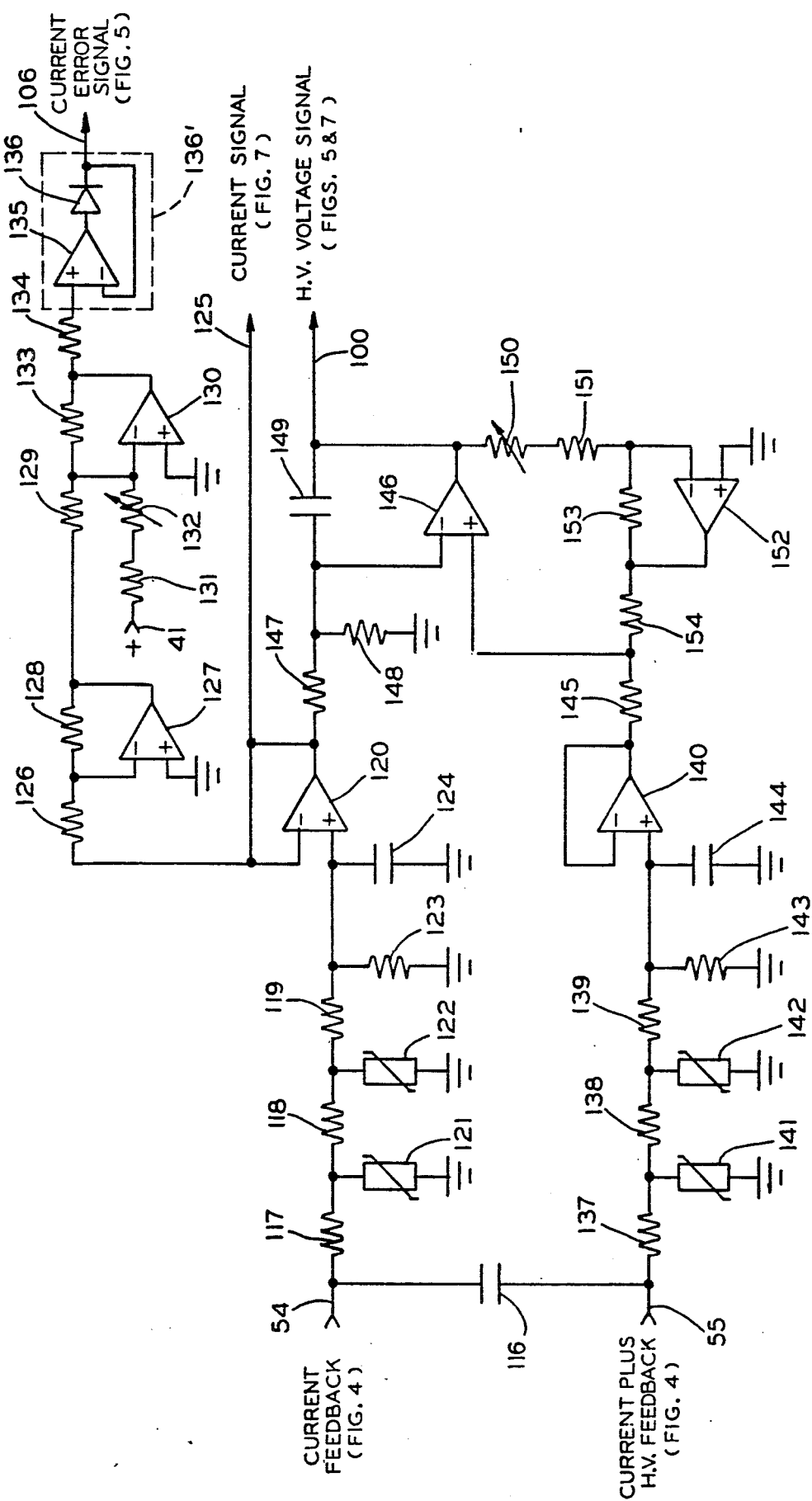
FIG. 6 is a detailed schematic diagram of voltage level control circuitry for an arc preventing electrostatic power supply according to the invention.

FIG. 6 illustrates details of the output current and voltage feedback circuit 22, the high voltage level control circuit 23 and other portions of the power supply 10 of FIG. 1. A capacitor 116 is connected between the current feedback output 54 (from FIG. 4) and the combined current and voltage feedback output 55 (from FIG. 4) The current feedback output 54, which is at a voltage proportional to the high voltage current, is connected through three series connected resistors 117–119 to the non inverting input of a voltage follower 120. The junction between the resistors 117 and 118 is connected through a transient suppressing varistor 121 to ground, the junction between the resistors 118 and 119 is connected through a transient suppressing varistor 122 to ground, and the non inverting input to the voltage follower 120 is connected through a parallel resistor 123 and capacitor 124 to ground to filter the input to the voltage follower 120.

Figure 7:
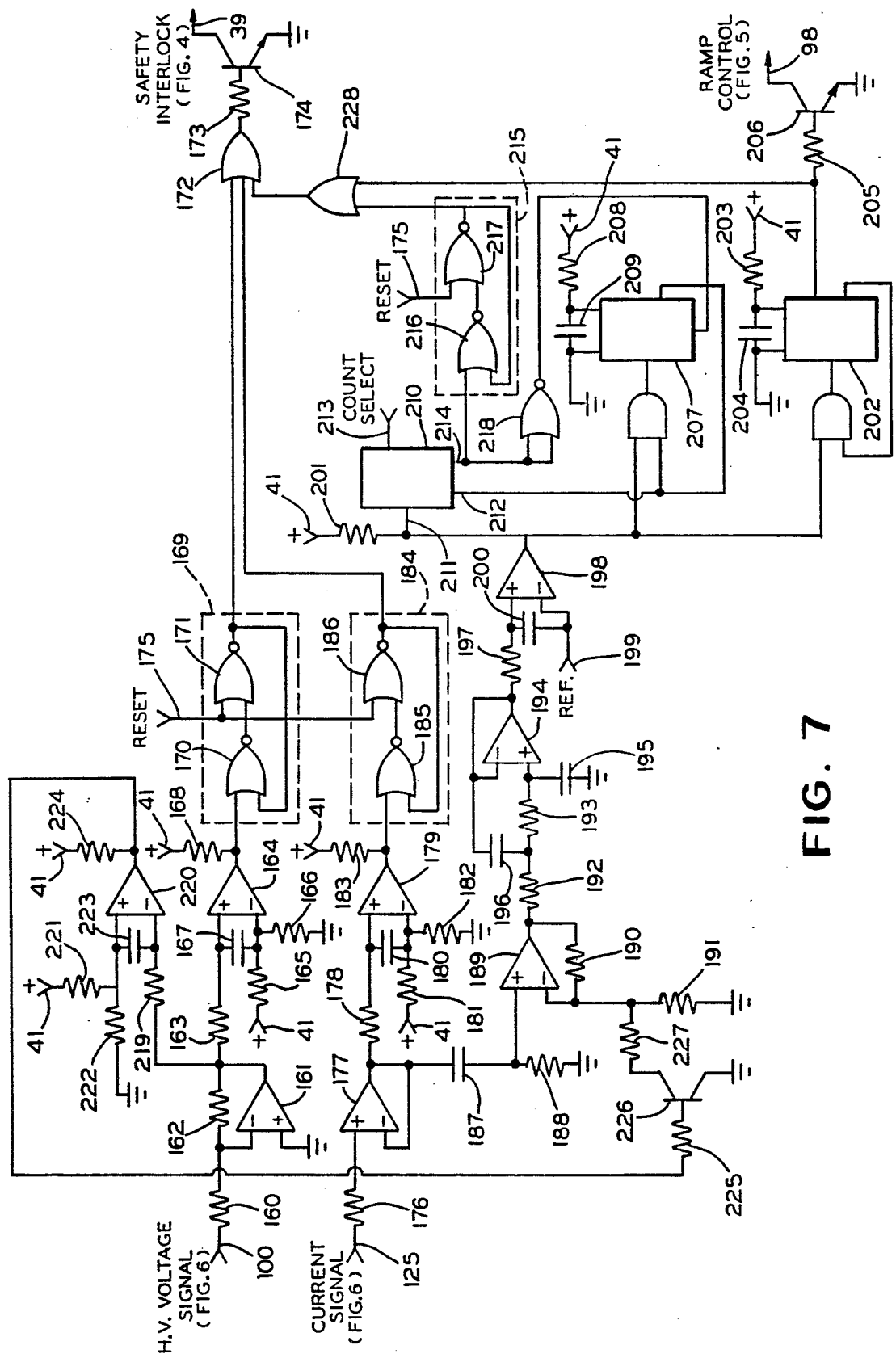
FIG. 7 is a detailed schematic diagram of arc detection interrupt and restart circuitry for an arc preventing electrostatic power supply according to the invention.

The output from the voltage follower 120 establishes a current signal output 125 (to FIG. 7). The output of the voltage follower 120 also is applied through a resistor 126 to the inverting input of a buffer amplifier 127. The amplifier 127 has a feedback resistor 128. The output from the amplifier 127 is applied through a resistor 129 to the inverting input of an amplifier 130. The positive terminal 41 also is connected through a fixed resistor 131 and a series variable resistor 132 to the inverting input of the amplifier 130. The amplifier 130 has a feedback resistor 133. The output of the amplifier 130 is applied through a resistor 134 to an amplifier 135 which with a diode 136 comprises an active diode 136'. The active diode 136' connects to the current error signal input 106 of FIG. 5.

Referring to FIGS. 1, 3, 5 and 6, no signal will appear on the current error signal input 106 so long as the input applied by the amplifier 130 to the amplifier 135 is less than the forward voltage of the diode 136. When the current feedback exceeds the setpoint adjustment of the variable resistor 132, the signal from the active diode 136' begins to go positive to produce a current error signal on the input 106. The active diode 136' will not have an output unless its input is positive. The current error signal input 106 is applied to the amplifier 105 of FIG. 5. As the high voltage current increases, the magnitude of the error signal input 106 will increase. The variable resistor 132 adjusts the high voltage current error setpoint at which the current error signal input 106 begins. Using the example illustrated in the graph of FIG. 3, the variable resistor 132 is adjusted to establish an error signal input 106 which begins when the current at the high voltage output 13 (FIG. 1) exceeds 45 $\mu$a. The error signal input 106 will increase substantially linearly as the output current increases above 45 $\mu$a. The error signal input 106 is applied to the amplifier 105 along with a high voltage level selection signal. As the error signal input 106 increases, the net input to the amplifier 105 decreases to cause the regulator 20 to lower the high voltage at the output 13. Consequently, the high voltage at the output 13 will decrease with increasing currents above 45 $\mu$a, as illustrated in FIG. 3.

Referring again to FIG. 6, the combined current and high voltage output 55 is connected through three series resistors 137–139 to the non inverting input of a voltage follower 140. A transient suppressing varistor 141 is connected from between the resistors 137 and 138 and ground, a varistor 142 is connected from between the resistors 138 and 139 and ground, and a parallel resistor 143 and capacitor 144 are connected from the input to the voltage follower 140 to ground to filter the input to the voltage follower 140. The output from the voltage follower 140, which is indicative of a combination of the high voltage output current and voltage, is applied through a resistor 145 to the non inverting input of a differential amplifier 146. A voltage divider consisting of two resistors 147 and 148 apply a portion of the output from the voltage follower 120, which output is indicative of the high voltage output current, to the inverting input to the differential amplifier 146, where it is subtracted from the combined high voltage output current and voltage. The resulting output from the differential amplifier 146 supplies the high voltage signal input 100 to the circuitry in FIGS. 5 and 7. A capacitor 148 is connected between the output of the amplifier 146 and the inverting input to the amplifier 146. The capacitor 148 acts as a filter which prevents possible oscillations as a consequence of the high operating frequency of the power module oscillator 51 (FIG. 4). The amplifier 146 has a feedback path formed by a variable resistor 150, a fixed resistor 151, an operational amplifier 152, a feedback resistor 153 and an output resistor 154. Since the feedback is applied to the non inverting input of the amplifier 146 with the combined current and high voltage feedback signal, the amplifier 152 inverts the feedback signal to provide the correct polarity. The variable resistor 150 is adjusted to provide a desired overall gain between the current and high voltage input 55 and the high voltage input signal 100 established at the output of the amplifier 146.

The high voltage input signal 100 is applied to the integrating amplifier 99 of FIG. 5. In the event that the voltage level at the high voltage output 13 drops, the application of a high voltage feedback signal to the integrating amplifier 99 causes the circuitry to attempt to regulate the output voltage.

FIG. 7 illustrates details of the safety interlocks and of the incipient arc detector 25 and of other portions of the power supply 10 of FIG. 1. The high voltage signal input 100 is applied through a resistor 160 to an amplifier 161 having a feedback resistor 162. The output from the amplifier 161 is applied through a resistor 163 to one input of a comparator 164. A voltage divider consisting of two resistors 165 and 166 apply a preselected portion of the voltage on the positive terminal 41 to the other input to the comparator 164. A capacitor 167 is connected between the two inputs to the comparator 164. The output from the comparator 164 is connected through a resistor 168 to the positive terminal 41. The comparator 164 will have a stepped output which will change levels when the voltage at the high voltage output 13 exceeds a predetermined overvoltage. The actual voltage at which the output of the comparator 164 changes is determined by the voltage applied to the comparator 164 by the voltage divider resistors 165 and 166. If the power supply 10 is designed, for example, to produce an output 13 at up to 100,000 volts, the voltage divider resistors 165 and 166 may be selected to cause the comparator 164 to detect an overvoltage at about 112,000 volts. It will be appreciated by those skilled in the art that the circuit may be modified so that the overvoltage setpoint is automatically adjusted to a lower level when the level of the selected output voltage is reduced by providing for automatic modification of the voltage divider resistors 165 and 166.

When an overvoltage event occurs and the output from the comparator 164 changes, a latch 169 consisting of two NOR gates 170 and 171 is set. The output from the latch 169 is applied through an OR gate 172 and a resistor 173 to the base of a transistor 174. The transistor 174 had a grounded emitter and a collector connected to the safety interlock; input 39 (FIG. 4). As a consequence of an overvoltage event the transistor 38 (FIG. 4) will be turned off to interrupt the high voltage output 13 until the latch 169 is reset by a pulse on a reset line 175. The overvoltage protection is redundant and will function only if other circuit portions of the power supply 10 fail.

The current signal output 125 (from FIG. 6) is applied through a resistor 176 to a voltage follower 177. The output from the voltage follower 177 is applied through a resistor 178 to a first input to a comparator 179. A capacitor 180 is connected between the two inputs to the comparator 179. A reference voltage is applied to the second input to the comparator 179 by a voltage divider consisting of two resistors 181 and 182 connected between the positive terminal 41 and ground. The output of the comparator 179 is connected through a resistor 183 to the positive terminal 41 and is connected to a latch 184 formed from two NOR gates 185 and 186. Whenever the high voltage output current exceeds a predetermined overcurrent, the output from the comparator 179 changes state to set the latch 184. The latch 184 will remain set until a reset pulse is applied to the reset input 175. The output from the latch 184 is applied to the OR gate 172 for establishing a safety interlock signal on the input 39 for interrupting the high voltage output in response to a high voltage overcurrent. This overcurrent protection is a redundant feature and is set to be effective only if the output voltage does not decrease as it is supposed to with excessive currents as a consequence of a circuit failure. Referring to the example illustrated in the graph of FIG. 3, the output voltage should drop from its normal maximum level at currents below 45 $\mu$a to zero as the current increases from 45 $\mu$a to 85 $\mu$a. The overcurrent protection may be set to block the output voltage only at a higher current, such as when the current reached 150 $\mu$a. The overcurrent setpoint is determined by the voltage divider resistors 181 and 182.

The output from the voltage follower 177, which is indicative of the current at the high voltage output 13, is used for sensing an incipient arc event. It is known that increased corona discharge will occur at the spray gun immediately prior to arcing. Such corona discharge produces a low level AC current superimposed on the much larger DC current. A capacitor 187 and a resistor 188 are connected from the output from the voltage follower 177 to ground to filter out the DC component from the output current feedback signal. The AC current component across the resistor 188 is applied to the non inverting input of an amplifier 189. The amplifier 189 has a feedback resistor 190 and a resistor 191 connected from its inverting input to ground to establish the gain of the amplifier 189. The output from the amplifier 189 is applied through two series connected resistors 192 and 193 to the non inverting input to a voltage follower 194. A capacitor 195 is connected from the non inverting input to the voltage follower 194 to ground and a capacitor 196 is connected from the inverting input of the voltage follower 194 to the junction between the resistors 192 and 193. The resistor 193 and the capacitors 195 and 196 and the voltage follower 194 form a low pass filter which removes high frequency noise from the AC current signal.

The output from the voltage follower 194 is applied through a resistor 197 to one input of a comparator 198. The other input to the comparator 198 is connected to a voltage reference source (not shown) through a terminal 199. A capacitor 200 is connected between the two inputs of the comparator 198. The comparator 198 compares the magnitude of the filtered and amplified AC component of the high voltage current to the reference voltage. If the AC current component exceeds a predetermined voltage, it is assumed that an arcing event is about to occur in the high voltage circuit. The reference voltage is set to cause the output from the comparator 198 to change at this setpoint voltage. Changes in the setpoint voltage where the output of the comparator 198 changes will change the sensitivity of the arc detection circuitry.

The output from the comparator 198 is connected through a resistor 201 to the positive terminal 41. The output from the comparator 198 also is connected to trigger a timer 202. A resistor 203 and a capacitor 204 determine the time interval measured by the timer 202. The resistor 203 and the capacitor 204 are selected to provide a short time interval for the timer 202, for example, an interval of only about 1 second. During such time interval after an incipient arc event is detected, the timer 202 applies an output through an OR gate 228 to the OR gate 172 to establish a safety interlock input 39 and through a resistor 205 to the base of a transistor 206. The emitter of the transistor 206 is grounded and the collector of the transistor 206 applies the ramp control input 98 to the junction 95 of FIG. 5. Consequently, whenever an incipient arc event is detected, the high voltage is interrupted by the safety interlock input 39 and the junction 95 is grounded through the transistor 206 to discharge the capacitor 96. After the timer 202 times out, the safety interlock input 39 is interrupted and the transistor 206 ceases to conduct. However, the high voltage is not immediately reestablished since there is no level selection voltage at the junction 95 which had been grounded. The resistor 94 and the capacitor 96 form an RC timing network which determines the soft start rate at which the high voltage ramps up to its normal high voltage level. In the exemplary graph of FIG. 2, the resistor 94 and the capacitor 96 are selected to provide a ramp up time of 4 seconds from zero volts to the maximum voltage.

Referring again to FIG. 7, the output from the comparator 198 also triggers a resettable timer 207. A resistor 208 and a capacitor 209 determine the time interval measured by the timer 207. The timer 207 is set to measure an interval appreciably longer than the timer 202, for example, an internal of about 30 seconds. Each detected incipient arc event retriggers the timer 210, even if it has not timed out. The timer 207 controls the operation of a shift register 210 which counts the number of incipient arc events occurring in a predetermined interval. Each detected incipient arc event appearing at the output of the comparator 198 is applied to a clock input 211 to the shift register 210. The shift register 210 also has an input 212 connected to the output from the timer 207. The output from the timer 207 applied to the input 212 changes the configuration of the shift register 210 from parallel to serial. The shift register 210 also has inputs 213 which determine the count at which the shift register 210 establishes an output at 214. The count set inputs 213 may, for example, cause the shift register to have an output at 214 after counting 4, 5, 6, 7 or 8 incipient arc events.

The output 214 from the shift register 210 sets a latch 215 which consists of two NOR gates 216 and 217 and also is applied through a NOR gate 218 to reset the timer 207. When the timer 207 is reset or times out, the shift register 210 also is reset. The output from the latch 215 is applied through the OR gate 228 to the OR gate 172 to establish a safety interlock signal at 39 for interrupting the high voltage at the output 13. Consequently, in the event that an incipient arc event is detected, the high voltage at the output 13 is interrupted for a brief interval, such as about 1 second, as determined by the timer 202. After such time interval has elapsed, the voltage at the output 13 will begin to ramp up at a rate determined by the resistor 94 and the capacitor 96 (FIG. 5). If the arc condition remains or reoccurs, a second incipient arc event is detected before the voltage at the output 13 is sufficiently high to permit an arc. If repeated arc events are detected with each consecutive event restarting the timer 207 before it times out until the shift register 210 reaches the count set by the inputs 213, the latch 215 is set and further restarting is discontinued until the latch 215 is reset by a pulse on the reset line 175.

It should be noted that the magnitude of the AC component superimposed on the high voltage DC current as a consequence of corona discharge prior to arcing will vary in part with the magnitude of the DC voltage. At low voltages as occur during a soft start, the AC component prior to arcing will be much less that at higher DC voltages. In order to further prevent the risk of arcing during a soft start, the gain of the incipient arc detection circuitry is increased when the magnitude of the high voltage output is less than a predetermined setpoint level, such as less than 10,000 volts. Referring still to FIG. 7, the high voltage signal as taken at the output from the amplifier 161 is applied through a resistor 219 to an input to a comparator 220. A voltage divider consisting of two resistors 221 and 222 apply a predetermined positive voltage to the other input to the comparator 220. A capacitor 223 is connected between the inputs to the comparator 220. The output of the comparator 220 is connected through a resistor 224 to the positive terminal 41. The voltage divider resistors 221 and 222 are selected to produce a change in the output of the comparator when the high voltage at the output 13 drops below, for example, 10,000 volts. The output from the comparator 220 is applied through a resistor 225 to the base of a transistor 226. The emitter of the transistor 226 is grounded and the collector is connected through a resistor 227 to the inverting input to the amplifier 189 in the incipient arc detection circuit. So long as the voltage at the output 13 exceeds the preselected 10,000 volts, the transistor 226 will be off. When the voltage at the output 13 is less than the preselected 10,000 volts, the transistor 226 will conduct to connect the resistor 227 in parallel with the resistor 191, thereby increasing the gain of the amplifier 189. This increases the magnitude of any AC component in the output current whenever the output voltage is less than the preselected 10,000 volts. Consequently, the output of the comparator 198 will change to indicate an incipient arc event when the AC component is at a lower level when the output voltage is less than the 10,000 volt setpoint.

Although a preferred embodiment of the power supply 10 has been shown and described, it will be appreciated that various modifications and changes may be made without departing from the spirit and the scope of the following claims.

I claim:

1. An arc preventing electrostatic power supply comprising means for generating a predetermined DC output voltage having a substantially constant maximum voltage at up to a predetermined output current and having a voltage which rapidly decreases from said maximum voltage as such output current increases above said predetermined output current, means for detecting incipient arc events of such output voltage, means responsive to the detection of incipient arcing of such output voltage for interrupting such output voltage for a predetermined time interval, and means for ramping such output from a predetermined low level to said predetermined voltage after elapse of such predetermined time interval.

2. An arc preventing electrostatic power supply, as set forth in claim 1, wherein said output is ramped from said predetermined low level to said predetermined voltage whenever said output voltage is established.

3. An arc preventing electrostatic power supply, as set forth in claim 2, wherein said predetermined low level of said output is zero volts.

4. An arc preventing electrostatic power supply, as set forth in claim 3, wherein said means for detecting incipient arc of such output voltage includes means for detecting any AC component of such output current, and means responsive to the magnitude of such AC current component for detecting an incipient arc event of such output voltage.

5. An arc preventing electrostatic power supply comprising means for generating a predetermined DC output voltage, means for detecting incipient arc events of such output voltage including means for detecting the output current of such output voltage, means for detecting any AC component of such output current, and means responsive to the magnitude of such AC current component for detecting an incipient arc event of such output voltage, said magnitude responsive means being responsive to a first magnitude when such output voltage is less than a first voltage and being responsive to a second magnitude greater than said first magnitude when such output voltage is greater than said first voltage for detecting an incipient arc event, means responsive to the detection of incipient arcing of such output voltage for interrupting such output voltage for a predetermined time interval, means for ramping such output for a predetermined low level to said predetermined voltage after elapse of such predetermined time interval, said ramping means ramping such output from said predetermined low level to said predetermined voltage whenever said output is established.

6. An arc preventing electrostatic power supply, as set forth in claim 5, wherein said generating means generates said predetermined DC voltage at a maximum voltage at up to a predetermined output current and at a voltage which rapidly decreases from said maximum voltage as such output current increases above said predetermined output current.

7. An arc preventing electrostatic power supply, as set forth in claim 5, wherein said predetermined low level of said output is zero volts.

8. An arc preventing electrostatic power supply, as set forth in claim 5, and further including means responsive to said detecting means for counting the number of detected incipient arc events within a second predetermined time, and means responsive to a predetermined count of such incipient arc events within such second predetermined time for inhibiting such output voltage.

9. A method for operating an electrostatic power supply comprising the steps of:

a) generating a predetermined high voltage output to have a substantially constant high maximum voltage when the output current is no greater than a predetermined current and to have a voltage which rapidly decreases from said maximum voltage as said current increases above said predetermined current;

b) interrupting said high voltage output in response to detecting incipient arcing from said high voltage output;

c) a predetermined time after said high voltage output is interrupted, ramping said output from a predetermined low level to said predetermined high level determined by the output current; and d) interrupting said output as it is ramped to said predetermined high level in response to detecting incipient arcing from said output.

10. A method for operating an electrostatic power supply, as set forth in claim 9, wherein said output is ramped from zero volts to said predetermined high level.

11. A method for operating an electrostatic power supply, as set forth in claim 9, wherein said output is interrupted for no greater than about 1 second in response to detecting incipient arcing from said high voltage output.

12. A method for operating an electrostatic power supply, as set forth in claim 9, and including the step of counting the number of times said high voltage output is interrupted and ceasing to ramp the output after a predetermined number of interruptions within a second predetermined time.

* * * * *